United States Patent
Sakaue et al.

(10) Patent No.: US 6,660,451 B1
(45) Date of Patent: Dec. 9, 2003

(54) OPTICAL INFORMATION RECORDING MEDIUM

(75) Inventors: Yoshitaka Sakaue, Osaka (JP); Eiji Ohno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/592,126

(22) Filed: Jun. 12, 2000

(30) Foreign Application Priority Data

Jun. 18, 1999 (JP) ............................................ 11-173235
Mar. 16, 2000 (JP) ...................................... 2000-074746

(51) Int. Cl.$^7$ ................................................ G11B 7/24
(52) U.S. Cl. ............... 430/270.13; 430/945; 369/275.2; 369/275.5; 428/64.5
(58) Field of Search ................................ 430/945, 270.13; 369/275.2, 275.5; 428/64.5

(56) References Cited

U.S. PATENT DOCUMENTS

| | | | | |
|---|---|---|---|---|
| 4,670,345 A | * | 6/1987 | Morimoto et al. | 430/945 |
| 5,187,052 A | * | 2/1993 | Maeda et al. | 430/945 |
| 5,688,574 A | * | 11/1997 | Tamura et al. | 430/945 |
| 5,709,978 A | | 1/1998 | Hirotsune et al. | 430/270.13 |
| 5,753,413 A | * | 5/1998 | Nishida et al. | 430/270.13 |
| 5,914,214 A | * | 6/1999 | Ohta et al. | 430/270.13 |
| 6,040,030 A | * | 3/2000 | Utsunomiya et al. | 430/270.13 |
| 6,096,399 A | * | 8/2000 | Yoshinari et al. | 430/945 |
| 6,153,063 A | | 11/2000 | Yamada et al. | 428/65.5 |

FOREIGN PATENT DOCUMENTS

| | | | | |
|---|---|---|---|---|
| EP | 0335469 | * | 10/1989 | 430/270.13 |
| EP | 0387898 | * | 9/1990 | 430/270.13 |
| EP | 0391423 | * | 10/1990 | 430/270.13 |
| EP | 825 595 | | 2/1998 | |
| EP | 897 177 | | 2/1999 | |
| JP | 63-155442 | * | 6/1988 | 430/270.13 |
| JP | 63-167450 | | 7/1988 | |
| JP | 02-261822 | * | 10/1990 | 430/270.13 |
| JP | 02-273343 | * | 11/1990 | 430/270.13 |
| JP | 3-181029 | | 8/1991 | |
| JP | 03-231890 | * | 10/1991 | 430/270.13 |
| JP | 03-248338 | * | 11/1991 | 430/270.13 |
| JP | 03-262684 | * | 11/1991 | 430/270.13 |

(List continued on next page.)

OTHER PUBLICATIONS

Machine translation of JP 10–275360 (Otowa et al.)*

*Primary Examiner*—Martin Angebranndt
(74) *Attorney, Agent, or Firm*—Merchant & Gould P.C.

(57) ABSTRACT

An optical information recording medium that is a phase-change type optical disk includes, on a transparent substrate having a land and a groove, a phase-change type recording layer in which an optically detectable reversible change occurs between an amorphous phase and a crystalline phase by irradiation with an energy beam, wherein dielectric layers are provided so as to be in contact with at least one side of the phase-change type recording layer, the phase-change type recording layer contains at least one selected from the group consisting of Te, Se, Sb, In, Ge, and Ag as a main component, aid the dielectric layers contain, as main components thereof, at least one selected from the group consisting of Ge and Si, and N. The dielectric layers contain an element β (where β is at least one element selected from the group consisting of Ti, Zr, Hf, V, Nb, Ta, Cr, Mo, W, Mn, Tc, Re, Cu, Ag, Au, Zn, and Cd) or an element γ (where γ is at least one element selected from the group consisting of Sb, Te, Se, Sn, Ga, and In), and the phase-change type recording layer contains an element α (where α is at least one element selected from the group consisting of Ti, Zr, Hf, V, Nb, Ta, Cr, Mo, W, Mn, Tc, Re, Cu, Ag, Au, Zn, and Cd). Thus, the optical information recording medium of the present invention exhibits satisfactory cycle characteristics, in which movement of a material in a phase-change type recording layer is suppressed even with a large number of repetitions of so-called land & groove recording.

9 Claims, 1 Drawing Sheet

FOREIGN PATENT DOCUMENTS

| | | |
|---|---|---|
| JP | 7-161072 | 6/1995 |
| JP | 7-223372 | 8/1995 |
| JP | 8-127176 | 5/1996 |
| JP | 97 34298 | 9/1997 |
| JP | 10-154351 | 6/1998 |
| JP | 10-275360 | 10/1998 |

* cited by examiner

OPTICAL INFORMATION RECORDING MEDIUM

BACKGROUND OF THE INVENTION

1. Field of the Invention

The present invention relates to an optical information recording medium for recording/reproducing information at high speed and high density using optical means such as a laser beam.

2. Description of the Related Art

A technique of recording/reproducing information at high density using a laser beam is known. Mainly, optical disks have been put into practical use for such a purpose.

Optical disks are classified roughly into a read-only type, a write-once type, and a rewritable type. Examples of the read-only type include compact disks and laser disks. The write-once type and the rewritable type are used for document files, data files, etc. The rewritable optical disks are classified mainly into a magneto-optical type and a phase-change type. The phase-change type optical disks use a reversible change in a recording layer between an amorphous phase and a crystalline phase (or between different crystal structures) under the irradiation with a laser beam. In this case, recording is performed by changing at least one of a refractive index or an extinction coefficient of a thin film under the irradiation with a laser beam, and the amplitude of transmission light or reflection light is changed in an area irradiated with a laser beam. Therefore, in general, the phase-change type optical disk includes a dielectric layer, a recording layer, a reflection layer, and a protection layer on a substrate. There is an example of a disk structure in which a first dielectric layer, a recording layer, a second dielectric layer, a reflection layer, and a protection layer are formed on a substrate in this order.

For the dielectric layer, compounds such as $SiO_2$, SiO, $TiO_2$, MgO, $Ta_2O_5$, $Al_2O_3$, $GeO_2$, SiC, ZnS, ZnSe, ZnTe, and PbS, those mainly containing a nitride, such as $Ge_3N_4$, $Si_3N_4$, SbN, BN, and AlN, or mixtures thereof can be used.

Furthermore, JP 09-834298 A and JP 10-275360 A disclose optical disks with enhanced cycle characteristics, in which a GeON dielectric layer or a GeN dielectric layer is provided between the above-mentioned dielectric layer and the recording layer.

Examples of the material for the substrate include glass, quartz, polycarbonate, and polymethylmetahcrylate. Furthermore, the substrate may be made of a smooth flat plate, or may have groove-shaped unevenness for tracking. A signal is reproduced in this unevenness by detecting a change in amount of transmission light or reflection light that leads to an information recording/reproduction detection system. When seen from an incident side of a laser beam for reproduction, a distant portion (i.e., a convex portion on a disk substrate) is called a land, and a close portion (i.e., a concave portion on a disk substrate) is called a groove.

The protection layer can be obtained by dissolving resin in a solvent, followed by coating and drying, or by attaching a resin plate with an adhesive.

The recording layer, dielectric layer, and reflection layer are formed on a transparent substrate by vacuum deposition or sputtering.

High reliability is required of optical disks, such as high density recording, large capacity, and repeated recording/reproduction characteristics (hereinafter, referred to as "cycle characteristics"). In order to record information on an optical disk at high density, for example, small recording marks are formed by using a laser beam with a short wavelength, and the widths of the groove and the land on a substrate are required to be small. Recording information on both a land and a groove (land & groove recording) also is advantageous for high-density recording.

However, it is difficult to keep reliability such as cycle characteristics while performing high-density recording. In particular, when land & groove recording is performed on a phase-change type optical disk, cycle characteristics are likely to be degraded in the land along with an increase in the number of recording/reproduction.

When recording is repeated a number of times, a jitter value is increased, which is caused by local movement of a material in the recording layer. When a signal is recorded on a phase-change type optical disk, the recording layer is headed to about 600° C. with a laser beam, followed by melting and cooling. Repeated recording of a signal results in the repetition of this cycle; consequently, other layers forming a disk such as a dielectric layer and a disk substrate are subjected to thermal expansion and contraction repeatedly. Thus, it is conceivable that the local movement of a material in the recording layer is caused by the expansion and contraction. The reason for the difference in cycle characteristics between the land and the groove is not known. Although an exact mechanism is not known, the following is supposed: the heated recording layer is cooled differently between the land and the groove; the land is less likely to be cooled, so that the land may reach a temperature higher than that of the groove; the land is just less likely to be cooled and returns to a room temperature finally; therefore, the land is subjected to a larger temperature difference, resulting in larger expansion and contraction, compared with the groove.

SUMMARY OF THE INVENTION

Therefore, with the foregoing in mind, it is an object of the present invention to provide an optical information recording medium with satisfactory cycle characteristics, in which movement of a material in a recording layer is suppressed even when so-called land & groove recording is performed repeatedly.

In order to achieve the above-mentioned object, the first optical information recording medium of the present invention is a phase-change type optical disk including, on a transparent substrate having a convex land and a concave groove for tracking, a phase-change type recording layer in which an optically detectable reversible change occurs between an amorphous phase and a crystalline phase at least by irradiation with an energy beam, wherein a signal is recorded on both the land and the groove, the phase-change type optical disk includes a dielectric layer in contact with at least one side of the phase-change type recording layer, the phase-change type recording layer contains, as its main component, at least one selected from the group consisting of Te, Se, Sb, In, Ge, and Ag, the dielectric layers contain, as main components thereof, at least one selected from the group consisting of Ge and Si, and N, and contain an element β (where β is at least one element selected from the group consisting of Ti, Zr, Hf, V, Nb, Ta, Cr, Mo, W, Mn, Tc, Re, Cu, Ag, Au, Zn, and Cd), and the phase-change type recording layer contains an element α (where α is at least one element selected from the group consisting of Ti, Zr, Hf, V, Nb, Ta, Cr, Mo, W, Mn, Tc, Re, Cu, Ag, Au, Zn, and Cd).

The second optical information recording medium of the present invention includes, on a transparent substrate having unevenness for tracking, a phase-change type recording layer that reversibly changes between an amorphous phase and a crystalline phase and contains at least one selected from the group consisting of Te, Se, Sb, and In, wherein a thickness of then phase-change type recording layer is in a range of 5 nm to 15 nm, a dielectric layer containing at least one selected from the group consisting of Ge and Si, and N are formed so as to be in contact with the phase-change type recording layer, and the dielectric layer contains an element γ (where γ is at least one element selected from the group consisting of Sb, Te, Se, Sn, Ga, and In).

These and other advantages of the present invention will become apparent to those skilled in the art upon reading and understanding the following detailed description with reference to the accompanying figure.

DESCRIPTION OF THE PREFERRED EMBODIMENTS

Figure 1:
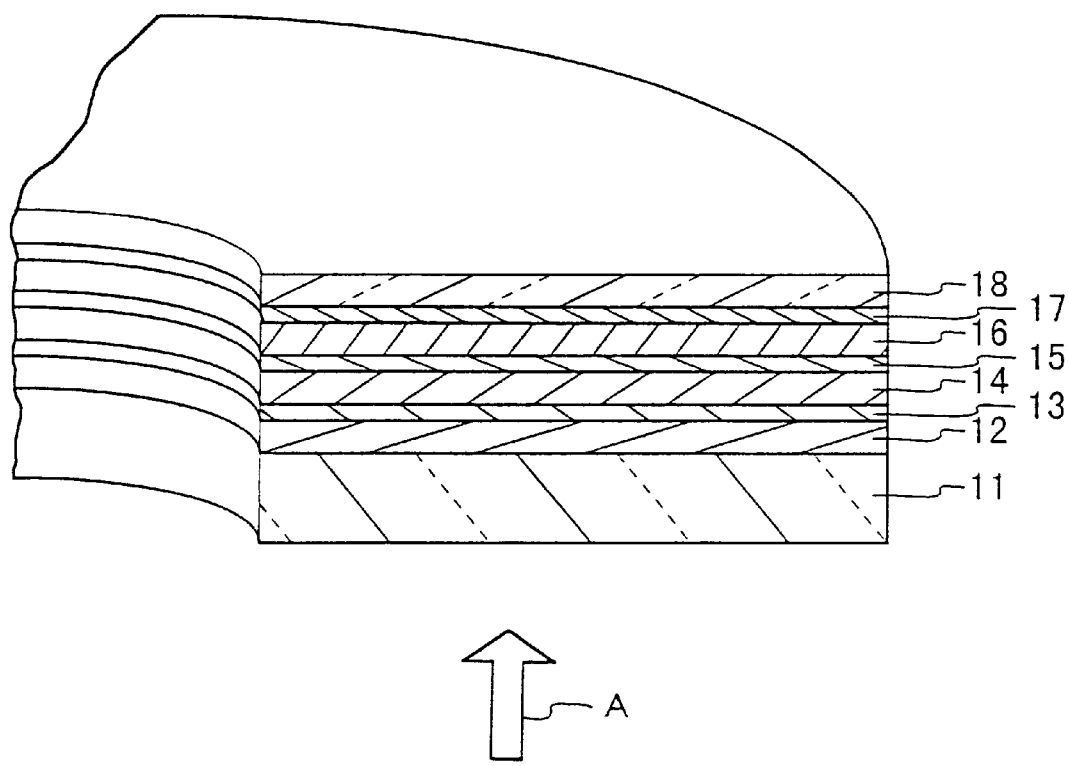
FIG. 1 is a schematic cross-sectional view illustrating a structure of an optical disk used in an embodiment of the present invention.

In the first optical information recording medium of the present invention, it is preferable that a thickness a of the phase-change type recording layer is in a range of 5 nm$\leq$a$\leq$15 nm.

Furthermore, in the above-mentioned optical information recording medium, it is preferable that a total amount X of the element α contained in the phase-change type recording layer is in a range of 0.5 atom %$\leq$X$\leq$10 atom %.

In the above-mentioned optical information recording medium, it is preferable that the phase-change type recording layer has a composition represented by SbTe α, GeSbTe α, GeSbTeSe α, GeTe α, TeSnGe α, GaSb α, InSe α, InSb α, InSbTe α, InSbSe α, InTeSe α (where α is at least one element selected from the group consisting of Ti, Zr, Hf, V, Nb, Ta, Cr, Mo, W. Mn, Tc, Re, Cu, Ag, Au, Zn, and Cd).

Furthermore, in the above-mentioned optical information recording medium, it is preferable that the phase-change type recording layer has a composition represented by GeSbTe α (where α is at least one element selected from the group consisting of Ti, Zr, Hf, V, Nb, Ta, Cr, Mo, W, Mn, Tc, Re, Cu, Ag, Au, Zn, and Cd).

Furthermore, in the above-mentioned optical information recording medium, it is preferable that the dielectric layer containing the element β is in contact with both sides of the phase-change type recording layer.

Furthermore, in the above-mentioned optical information recording medium, it is preferable that a content Y of the element β contained in the dielectric layer that is in contact with at least one side of the phase-change type recording layer is in a range of 5 atom %$\leq$Y$\leq$40 atom %.

Furthermore, in the above-mentioned optical information recording medium, it is preferable that the element α contained in the phase-change type recording layer is the same kind as that of the element β contained in the dielectric layer that is in contact with at least one side of the phase-change type recording layer.

Furthermore, in the above-mentioned optical information recording medium, it is preferable that the element α contained in the phase-change type recording layer is Cr.

In the second optical information recording medium of the present invention, it is preferable that a content of the element γ in the dielectric layer is in a range of 1 atom % to 20 atom %.

In the above-mentioned optical information recording medium, it is preferable that the dielectric layer containing at least one selected from the group consisting of Ge and Si, N, and the element γ is formed so as to be in contact with both sides of the phase-change type recording layer.

Furthermore, in the above-mentioned optical information recording medium, it is preferable that the phase-change type recording layer contains an element α (where α is at least one element selected from the group consisting of Sc, Y, Ti, Zr, Hf, V, Nb, Ta, Cr, Mo, W. Mn, Tc, Re, Fe, Ru, Os, Co, Rh, Ir, Ni, Pd, Pt, Cu, Ag, Au, Zn, and Cd).

According to the present invention, by adding the element β or γ to the dielectric layer that is in contact with at least one side of the phase-change type recording layer, a phase-change type optical information recording medium can be obtained, in which local movement of a material caused by cycle recording is further suppressed, compared with the case where an additive is added only to the phase-change type recording layer, and which exhibits satisfactory cycle characteristics even when land & groove recording is performed repeatedly.

Hereinafter, the present invention will be described with reference to the drawing. FIG. 1 is a schematic cross-sectional view illustrating a structure of a disk used in the present embodiment. A dielectric layer, a phase-change type recording layer, and a reflection layer are formed on a disk substrate 11 made of transparent resin by an ordinary method for forming a thin film such as sputtering. A first dielectric layer 12, a second dielectric layer 13, a phase-change type recording layer 14, a third dielectric layer 15, a fourth dielectric layer 16, and a reflection layer 17 are provided in this order on the disk substrate 11. A protection layer 18 may be formed on the reflection layer 17. The reflection layer 17 may be omitted. An arrow A represents the irradiation direction of a laser beam.

Examples of the material for the substrate 11 include glass, quartz, resin such as polycarbonate and polymethyl methacrylate. Among them, polycarbonate is particularly preferable. Furthermore, the disk substrate has groove-shaped unevenness (land and groove) for tracking on its surface.

The protection layer 18 is obtained by dissolving resin in a solvent, followed by coating and drying, or by attaching a resin plate with an adhesive.

Hereinafter, the first recording medium of the present invention will be described.

As a material for the recording layer 14, chalcogen alloys and the like are well-known, which change between an amorphous phase and a crystalline phase. For example, alloys such as a SbTe type, a GeSbTe type, a GeSbTeSe type, a GeSbTePd type, a TeGeSnAu type, an AgSbTe type, a GeTe type, a GaSb type, an InSe type, an InSb type, an InSbTe type, an InSbSe type, and an InSbTeAg type can be used, which have compositions containing other elements in such a range as not to influence the phase-change characteristics or optical characteristics. In the present embodiment, the recording layer made of a GeSbTe type chalcogen alloy will be described.

For the dielectric layers 12 and 16, compounds such as $SiO_2$, SiO, $TiO_2$, MgO, $Ta_2O_5$, $Al_2O_3$, $GeO_2$, SiC, ZnS, ZnSe, ZnTe, and PbS, those mainly containing a nitride, such as $Ge_3N_4$, $Si_3N_4$, SbN, BN, and AlN, or mixtures thereof can be used. In the present embodiment, a mixture of ZnS and $SiO_2$ is used for the dielectric layers 12 and 16. The mixture has a composition of 80 mol % of ZnS and 20 mol % of $SiO_2$.

The dielectric layers 13 and 15 should contain at least one selected from the group consisting of Ge and Si, and N as main components thereof. For example, the dielectric layers 13 and 15 may contain another element or a plurality of other elements, as in Ge—N—O and Ge—Si—N—O. Examples of other elements include Al, B, Ba, Bi, C, Ca, Ce, Cr, Dy, Eu, Ga, Hf, In, K, La, Mn, Nb, Ni, O, Pb, Pd, S, Si, Sn, Ta, Ti, V, W, Yb, Zn, and Zr. In the present embodiment, Ge—N is used for the dielectric layers 13 and 15. The mixture has a composition of 50 atom % of Ge and 50 atom % of N.

For the reflection layer 17, a metal material mainly containing Au, Al, Cu, Cr, Ni, Ti, etc., or a mixture thereof is preferably used, and a dielectric multi-layer film with a large reflectivity at a predetermined wavelength also may be used. In the present embodiment, an Au reflection layer is used.

Next, the second recording medium of the present invention will be described.

When an element α is added to the recording layer 14, movement of a material in the recording layer 14 can be suppressed. The element α is added preferably in an amount of 0.5 atom % to 10 atom %, more preferably in an amount of 1 atom % to 8 atom %. As the element α, Cr, Mn, W, Fe, and Ni are preferable, and Cr is particularly preferable.

The recording layer 14 with the element α added thereto is preferably represented by SbTe α, GeSbTe α, GeSbTeSe α, GeTe α, TeSnGe α, GaSb α, InSe α, InSb α, InSbTe α, InSbSe α, or InTeSe α, when expressed using constituent elements (without describing the quantity ratio of elements). It is particularly preferable that the recording layer 14 is represented by GeSbTe α.

As the materials for the dielectric layers 12 and 16, $SiO_2$, SiO, $TiO_2$, MgO, $Ta_2O_5$, $Al_2O_3$, $GeO_2$, SiC, ZnS, ZnSe, ZnTe, PbS, $Ge_3N_4$, $Si_3N_4$, SbN, BN, AlN, and mixtures thereof can be used. A mixture of ZnS and $SiO_2$ is preferable.

For the dielectric layers 13 and 15, a material containing Ge and/or Si, and N can be used preferably.

When an element γ is added to the dielectric layers, movement of a material in the recording layer 14 is suppressed. The element γ is added preferably in an amount of 1 atom % to 20 atom %, more preferably in an amount of 3 atom % to 18 atom %. As the element γ, Sb and Te are preferable. It is preferable that at least one dielectric layer that is in contact with the recording layer 14, in particular, the dielectric layers that are in contact with both sides of the recording layer 14, contain Ge and/or Si, N, and γ.

The dielectric layers 13 and 15 may contain other elements. For example, as in a Ge—N—O type and a Ge—Si—N—O type, an oxygen element may be contained. Furthermore, the dielectric layers 13 and 15 may contain, for example, Al, B, Ba, Bi, C, Ca, Ce, Cr, Dy, Eu, H, K, La, Mn, Nb, Ni, O, Pb, Pd, S, Ta, Ti, V, W, Yb, Zn, Zr, and the like.

For the reflection layer 17, a metal material mainly containing Au, Al, Cu, Cr, Ni, Ti, etc., or a mixture thereof is used preferably. Furthermore, a dielectric multi-layer film may be used, which has a large reflectivity at a wavelength of a laser beam to be used.

The dielectric layers 12, 13, 15, and 16, the recording layer 14, and the reflection layer 17 should be formed on the transparent substrate 11 by a thin film forming method such as sputtering or vapor deposition. The protection layer 18 may be provided on the reflection layer. The protection layer 18 can be formed by dissolving resin in a solvent, followed by coating and drying, or by attaching a resin plate with an adhesive.

The structure of the recording medium of the present invention is not limited to the embodiment shown in the drawing. For example, the present invention is applicable to an embodiment in which a reflection layer is not formed, an embodiment in which a light absorbing layer is provided on the dielectric layer, and the like. Furthermore, the dielectric layer is not limited to an embodiment in which two dielectric layers are formed on both sides of the recording layer, respectively, as shown in the drawing.

EXAMPLES

Hereinafter, the present invention will be described by way of examples. It should be understood that the present invention is not limited to the following examples.

Example 1

Regarding the case where an additive is added only to a GeSbTe phase-change type recording layer and the case where an additive is added to both the recording layer and dielectric layers that are in contact therewith, results of cycle characteristics will be described with a thickness of the recording layer being changed.

In the present example, a disk substrate made of polycarbonate, having a diameter (φ) of 120 mm and tracks for recording a signal, was used. A groove width and a land width were 0.62 μm, respectively.

A ZnS—$SiO_2$ mixed film was formed to a thickness of 120 nm as a first dielectric layer on the disk substrate by sputtering.

As a reference, the composition of a recording layer was prescribed to be Ge: Sb: Te=21.5: 24.7: 53.8 (atom %) (without addition of Cr). When Cr was added to GeSbTe, the composition of a recording layer was prescribed to be Ge: Sb: Te=21.5: 24.7: 53.8 (98 atom %)—Cr (2.0 atom %). More specifically, 2 atom % of Cr was added to 98 atom % of Ge—Sb—Te (having the same composition ratio as that of the reference).

As second and third dielectric layers, GeN films were formed to a thickness of 10 nm. As a reference, Cr was not added to the second and third dielectric layers. Furthermore, the composition of the second and third dielectric layers with Cr added thereto was prescribed to be Ge (45 atom %)—Cr (10 atom %)—N (45 atom %), and the thickness thereof was prescribed to be 10 nm.

As a fourth dielectric layer, a ZnS—$SiO_2$ film was formed to a thickness of 150 nm. A reflection layer was formed to a thickness of 20 nm by sputtering, using an Au film. Then, a protection layer of polycarbonate was provided on the reflection layer.

A laser device that utilizes a laser with a wavelength of 660 nm and a lens with a numerical aperture of 0.6 was used for recording/reproducing a signal with respect to the optical disk. An arrow A represents the irradiation direction of a laser beam.

A signal was overwritten randomly at a linear speed of 8.2 m/s under the conditions of a signaling system of 8/16, an RLL (2,10) modulation, a shortest bit length of 0.28 μm, a laser power for recording a signal of 12 mW, and a laser power for deleting the recorded signal of 5 mW, whereby cycle numbers at which a jitter value was less than 13% were investigated.

Disks were produced in which the thickness of a recording layer varied in a range of 3 nm to 25 nm, both in the case where Cr was not added to a recording layer and the case where Cr was added to a recording layer.

Table 1 shows cycle characteristics in the case where Cr was added neither to a recording layer nor to second and third dielectric layers. Table 2 shows cycle characteristics in the case where Cr was added only to a recording layer. Table 3 shows cycle characteristics in the case where Cr was added to a recording layer and second and third dielectric layers.

TABLE 1

Cr was added neither to a recording layer,
nor to second and third dielectric layers

| Thickness of a recording layer (nm) | Cycle number (jitter value < 13%) | |
|---|---|---|
| | Land | Groove |
| 3 | 1000 | 1000 |
| 5 | 10000 | 50000 |
| 10 | 20000 | 200000 |
| 15 | 15000 | 200000 |
| 20 | 5000 | 150000 |
| 25 | 1000 | 100000 |

TABLE 2

Cr was added only to a recording layer

| Thickness of a recording layer (nm) | Cycle number (jitter value < 13%) | |
|---|---|---|
| | Land | Groove |
| 3 | 1000 | 1000 |
| 5 | 100000 | 100000 |
| 10 | 150000 | 300000 |
| 15 | 100000 | 300000 |
| 20 | 30000 | 200000 |
| 25 | 10000 | 150000 |

TABLE 3

Cr was added to a recording layer, and
second and third dielectric layers

| Thickness of a recording layer (nm) | Cycle number (jitter value < 13%) | |
|---|---|---|
| | Land | Groove |
| 3 | 1000 | 1000 |
| 5 | 500000 | 500000 |
| 10 | 600000 | 700000 |
| 15 | 500000 | 500000 |
| 20 | 100000 | 250000 |
| 25 | 20000 | 200000 |

As is understood from Table 1, in the case where Cr was not added, the which a jitter value was less than 13% was 100000 or more in the groove at a recording layer thickness of 10 nm or more. In the land, with a decrease in thickness of a recording layer, cycle characteristics were enhanced; however, the most satisfactory cycle number was 20000. When the thickness of a recording layer was less than 10 nm, cycle characteristics were degraded. Furthermore, when the thickness of a recording layer was 3 nm, the cycle number was 1000 in both the land and the groove. This is because the thickness of the recording layer was so small that a recording layer was not changed satisfactorily between an amorphous phase and a crystalline phase, and the jitter value was high from the initial cycle.

Furthermore, as shown in Table 2, by adding Cr to a recording layer, cycle characteristics were enhanced both in the land and the groove at a recording layer thickness of 5 nm or more. Furthermore, at a recording layer thickness in a range of 5 nm to 15 nm, the cycle number of 100000 or more was obtained in both the land and the groove.

On the other hand, as shown in Table 3, in the case where Cr was added to a recording layer and second and third dielectric layers in contact therewith, compared with the case where Cr was added only to the recording layer as shown in Table 2, cycle characteristics were further enhanced in both the land and the groove. At a recording layer thickness of 5 nm to 15 nm, it was possible to keep the cycle number of 500000 or more.

As described above, when Cr was added to the recording layer and the second and third dielectric layers that are in contact with the recording layer, and the thickness of the recording layer was 5 nm to 15 nm, disks having satisfactory cycle characteristics of 500000 or more were obtained.

In the present example, Cr was used as an additive to the recording layer, and the second and third dielectric layers; however, even when Ti, Zr, Hf, V, Nb, Ta, Mo, W, Mn, Tc, Re, Cu, Ag, Au, Zn, or Cd is used for an additive, results similar to the above are obtained. When the above-mentioned plurality of elements were added simultaneously to the recording layer, and the second and third dielectric layers, results similar to the above also were obtained. Furthermore, even when the kind of an element to be added to the recording layer was different from that added to the second and third dielectric layers, results similar to the above were obtained.

In the present example, Cr was added to both the second and third dielectric layers in contact with both sides of the recording layer; however, even when Cr was added to either the second or third dielectric layer, results similar to the above were obtained.

In the present example, the composition of the recording layer was a three-element system (GeSbTe); however, even when an additive is added to recording layers having compositions represented by SbTe, GeSbTeSe, GeTe, TeSnGe, GaSb, InSe, InSb, InSbTe, InSbSe, and InTeSe, results similar to the above are obtained.

Example 2

The added amount of Cr and cycle characteristics will be described in the case where Cr is added to a GeSbTe phase-change type recording layer and second and third dielectric layers that are in contact with the recording layer.

The structure of an optical disk used in the present example, and a method for evaluating the disk were the same as those in Example 1, except that the thickness of the recording layer was set at 10 nm. The composition of a recording layer with Cr added thereto was prescribed in the same way as in Example 1, in such a manner that the composition of a recording layer without Cr added thereto became Ge: Sb: Te=21.5: 24.7: 53.8 (atom %). For example, in the case where Cr was added in an amount of 0.2 atom %, the composition was adjusted to be Ge: Sb: Te=21.5: 24.7: 53.8 (98.0 atom %)—Cr (2.0 atom %).

Table 4 shows the added amount of Cr in a recording layer and results of cycle characteristics in the case where Cr was added only to a recording layer in a varying amount without adding it to second and third dielectric layers that are in contact with the recording layer. Table 5 shows the added amount of Cr in a recording layer and results of cycle characteristics in the case where Cr was added to a recording layer in a varying amount and to second and third dielectric layers in an amount of 10 atom %. Table 6 shows the added amount of Cr in second and third dielectric layers and results of cycle characteristics in the case where Cr was added to a recording layer in an amount of 2 atom % and to second and third dielectric layers in a varying amount.

TABLE 4

The added amount of Cr in a recording layer, and cycle characteristics
(Cr was not added to second and third dielectric layers)

| Added amount of Cr (atom%) | Cycle number (jitter value < 13%) | |
|---|---|---|
| | Land | Groove |
| 0 | 20000 | 200000 |
| 0.5 | 100000 | 250000 |
| 2 | 150000 | 300000 |
| 5 | 150000 | 300000 |
| 10 | 100000 | 150000 |
| 12 | 50000 | 100000 |
| 15 | 1000 | 10000 |

TABLE 5

The added amount of Cr in a recording layer, and cycle characteristics
(Cr was added to second and third dielectric layers in an amount of 10 atom %)

| Added amount of Cr (atom%) | Cycle number (jitter value < 13%) | |
|---|---|---|
| | Land | Groove |
| 0 | 10000 | 250000 |
| 0.5 | 500000 | 500000 |
| 2 | 500000 | 500000 |
| 5 | 600000 | 600000 |
| 10 | 600000 | 700000 |
| 12 | 100000 | 150000 |
| 15 | 5000 | 10000 |

TABLE 6

The added amount of Cr in second and third dielectric layers, and cycle characteristics
(Cr was added to a recording layer in an amount of 2 atom %)

| Added amount of Cr (atom%) | Cycle number (jitter value < 13%) | |
|---|---|---|
| | Land | Groove |
| 0 | 150000 | 300000 |
| 2 | 200000 | 350000 |
| 5 | 500000 | 500000 |
| 10 | 600000 | 700000 |
| 40 | 500000 | 500000 |
| 50 | 100000 | 200000 |

As is understood from Table 4, in the case where Cr was added to only a recording layer, in an added amount of Cr of 0.5 atom % to 10 atom %, the cycle number at which a jitter value was less than 13% was 100000 or more in both the land and the groove; however, it did not reach 500000.

On the other hand, as is understood from Table 5, by adding Cr to a recording layer, and second and third dielectric layers in contact therewith, cycle characteristics were enhanced in the land and the groove, and when Cr was added to a recording layer in an amount of 0.5 atom % to 10 atom %, cycle characteristics of 500000 or more were obtained in both the land and the groove. When the added amount exceeded 10 atom %, cycle characteristics were degraded in both the land and the groove. This is not because a material was moved locally after a number of cycles, but because a jitter value was high from the initial cycle, since a crystallization speed of a recording layer was changed too much due to the addition of Cr.

Furthermore, as is understood from Table 6, by adding Cr to second and third dielectric layers in contact with a recording layer as well as the recording layer, cycle characteristics were enhanced in the land and the groove, and when Cr was added to second and third dielectric layers in an amount of 5 atom % to 40 atom %, cycle characteristics of 500000 or more were obtained in both the land and groove.

As described above, when Cr was added to the second and third dielectric layers as well as the recording layer, and Cr was added to the recording layer in an amount of 0.5 atom % to 10 atom % and added to the second and third dielectric layers in an amount of 5 atom % to 40 atom %, satisfactory cycle characteristics of 500000 or more were obtained.

In the present example, the thickness of the recording layer was 10 nm; however, even when the thickness of the recording layer was 5 nm to 15 nm, results similar to the above were obtained.

In the present example, Cr was added to both the second and third dielectric layers in contact with both sides of the recording layer; however, even when Cr was added to either the second or third dielectric layer, results similar to the above were obtained.

In the present example, Cr was used as an additive to the recording layer, and the second and third dielectric layers; however, even when Ti, Zr, Hf, V, Nb, Ta, Mo, W, Mn, Tc, Re, Cu, Ag, Au, Zn, or Cd is used for an additive, results similar to the above are obtained. When the above-mentioned plurality of elements were added simultaneously to the recording layer, and the second and third dielectric layers, results similar to the above also were obtained. Furthermore, even when the kind of an element to be added to the recording layer was different from that added to the second and third dielectric layers, results similar to the above were obtained.

In the present example, the composition of the recording layer was a three-element system (GeSbTe); however, even when an additive is added to recording layers having compositions represented by SbTe, GeSbTeSe, GeTe, TeSnGe, GaSb, InSe, InSb, InSbTe, InSbSe, and InTeSe, results similar to the above are obtained.

Example 3

In the present example, using an optical disk with the same structure as that shown in FIG. 1, cycle characteristics were measured in the case where an additive was added to the second and third dielectric layers, and the thickness of the recording layer was varied.

The structure of the optical disk used in the present example and a method for evaluating the disk were the same as those in Example 1, except that Sb was added to the second and third dielectric layers in contact with the recording layer so as to obtain an atomic ratio of Ge: N:Sb= 45:45:10 (i.e., $(Ge_{50}N_{50})_{90}Sb_{10}$). The composition of the recording layer was prescribed to be $Ge_{21.5}Sb_{24.7}Te_{53.8}$ (containing no additive), and its thickness was selected from a range of 3 nm to 25 nm.

Table 7 shows cycle characteristics in the case where Sb was not added to the dielectric layers, and Table 8 shows cycle characteristics in the case where Sb was added to the dielectric layers.

TABLE 7

Sb was not added

| Thickness of a recording layer (nm) | Cycle number jitter value < 13%) | |
|---|---|---|
| | Land | Groove |
| 3 | 1000 | 1000 |
| 5 | 10000 | 50000 |
| 10 | 20000 | 200000 |
| 15 | 15000 | 200000 |
| 20 | 5000 | 150000 |
| 25 | 1000 | 100000 |

TABLE 8

Sb was added

| Thickness of a recording layer (nm) | Cycle number jitter value < 13%) | |
|---|---|---|
| | Land | Groove |
| 3 | 10000 | 10000 |
| 5 | 100000 | 100000 |
| 10 | 150000 | 250000 |
| 15 | 150000 | 250000 |
| 20 | 50000 | 200000 |
| 25 | 20000 | 150000 |

As understood from Table 7, in the case where Sb was not added, and the thickness of a recording layer was 10 nm or more, the cycle number at which a jitter value was less than 13% was 100000 or more in the groove. In the land, the cycle number at which a jitter value was less than 13% was 20000 or less.

On other hand, as shown in Table 8, by adding Sb to dielectric layers in contact with a recording layer, cycle characteristics were enhanced in both the land and the groove at a recording layer thickness of 5 nm or more. In particular when the thickness of a recording layer was in a range of 5 nm to 15 nm, the cycle number of 100000 or more was obtained in both the land and the groove.

In the present example, Sb was added to the second and third dielectric layers; however, even when Te, Se, Sn, Ga, and In were used for an additive, cycle characteristics were enhanced. When the above-mentioned plurality of elements were added simultaneously to the dielectric layers, results similar to the above also were obtained. In the present example, the composition of the recording layer was a three-element system (GeSbTe); however, even when an additive is added to recording layers having compositions represented by SbTe, GeSbTeSe, GeTe, TeSnGe, GaSb, InSe, InSb, InSbTe, InSbSe, and InTeSe, cycle characteristics are enhanced. In the present example, Sb was added to both the second and third dielectric layers in contact with both sides of the recording layer; however, even when Sb was added to either the second or third dielectric layer, cycle characteristics were enhanced. Furthermore, in the present example, Sb was added to the dielectric layers made of GeN; however, even in the case of dielectric layers containing at least one selected from the group consisting of Ge and Si, and N, such as a dielectric layer of SiCN, cycle characteristics are enhanced.

Example 4

In the present example, using an optical disk having the same structure as that in FIG. 1, cycle characteristics were measured in the case where an additive was added to the second and third dielectric layers and the amount of an additive was varied.

The structure of the optical disk used in the present example and a method for evaluating the disk were the same as those in Example 1, except that Sb was added to the second and third dielectric layers in contact with the recording layer, and the composition of the dielectric layers with Sb added thereto was adjusted in the same way as in Example 3, in such a manner that the composition of the dielectric layers with q atom % of Sb added thereto became $(Ge_{50}N_{50})_{100-q}Sb_q$. Furthermore, the composition of the recording layer was prescribed to be $Ge_{21.5}Sb_{24.7}Te_{53.8}$ (containing no additive), and its thickness was set at 10 nm.

Table 9 shows the relationship between the added amount of Sb in the second and third dielectric layers and the cycle characteristics.

TABLE 9

| Thickness of a recording layer (nm) | Cycle number jitter value < 13%) | |
|---|---|---|
| | Land | Groove |
| 3 | 20000 | 200000 |
| 1.0 | 100000 | 200000 |
| 5.0 | 150000 | 250000 |
| 10 | 150000 | 250000 |
| 20 | 100000 | 150000 |
| 22 | 70000 | 100000 |
| 25 | 50000 | 50000 |

As is understood from Table 9, in particular, when an added amount of Sb was in a range of 1.0 atom % to 20 atom %, the cycle number at which a jitter value was less than 13% was 100000 or more in both the land and the groove. When the amount of Sb added exceeded 20 atom %, cycle characteristics were degraded. This is not because a material was moved locally in the recording layer, but because a jitter value was high from the initial cycle, since an apparent crystallization speed of the recording layer was changed due to the addition of Sb.

In the present example, Sb was added to the second and third dielectric layers; however, even when Te, Se, Sn, Ga, and In were used for an additive, cycle characteristics were enhanced. When the above-mentioned plurality of elements were added simultaneously to the dielectric layers, results similar to the above also were obtained. In the present example, the composition of the recording layer was a three-element system (GeSbTe); however, even when an additive is added to recording layers having compositions represented by SbTe, GeSbTeSe, GeTe, TeSnGe, GaSb, InSe, InSb, InSbTe, InSbSe, and InTeSe, cycle characteristics are enhanced. In the present example, Sb was added to both of the second and third dielectric layers in contact with both sides of the recording layer; however, even when Sb was added to either the second or third dielectric layer, cycle characteristics were enhanced. Furthermore, in the present example, Sb was added to the dielectric layers made of GeN; however, even in the case of dielectric layers containing at least one selected from the group consisting of Ge and Si, and N, such as a dielectric layer of SiCN, cycle characteristics are enhanced.

As described above, according to the first information recording medium of the present invention, by adding at least one selected from the group consisting of Ti, Zr, Hf, V, Nb, Ta, Cr, Mo, W, Mn, Tc, Re, Cu, Ag, Au, Zn, and Cd to a recording layer and dielectric layers that are in contact therewith, local movement of a material after a number of cycles is further suppressed. Consequently, an optical disk with satisfactory cycle characteristics of overwriting/reproduction can be provided.

Furthermore, according to the second information recording medium of the present invention, by forming dielectric layers, which contain at least one selected from the group consisting of Ge and Si, N, and an element γ, so that they come into contact with a recording layer, movement of a material in the recording layer is suppressed. Consequently, a phase-change type optical information recording medium having satisfactory cycle characteristics can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising, on a transparent substrate having unevenness for tracking and wherein a signal is recorded on both land and groove, a phase-change type recording layer that reversibly changes between an amorphous phase and a crystalline phase and contains at least one selected from the group consisting of Te, Se, Sb, In, and Ge, wherein a thickness of the phase-hange type recording layer is between 5 nm and 15 nm, and a dielectric layer comprising at least one selected from the group consisting of Ge and Si, and N is formed so as to be in contact with the phase-change type recording layer, and wherein the phase-change type recording layer contains Cr in an amount of 0.5 to 10 atom % and the dielectric layer contains Cr in an amount of 5 to 40 atom %.

2. An optical information recording medium according to claim 1, wherein the dielectric layer contains an element γ (where γ is at least one element selected from the group consisting of Sb, Te, Se, Sn, Ga, and In), and wherein a content of the element γ in the dielectric layer is in a range of 1 atom % to 20 atom %.

3. An optical information recording medium according to claim 2, wherein a plurality of the dielectric layers containing at least one selected from the group consisting of Ge and Si, N, and the element γ are formed so as to be in contact with both sides of the phase-change type recording layer.

4. An optical information recording medium according to claim 1, wherein the phase-change type recording layer contains an element α (where α is at least one element selected from the group consisting of Sc, Y, Ti, Zr, Hf, V, Nb, Ta, Mo, W, Mn, Tc, Re, Fe, Ru, Os, Co, Rh, Ir, Ni, Pd, Pt, Cu, Ag, Au, Zn, and Cd).

5. An optical information recording medium that is a phase-change type optical disk comprising, on a transparent substrate having a convex land and a concave groove for tracking, a phase-change type recording layer in which au optically detectable reversible change occurs between an amorphous phase and a crystalline phase by irradiation with an energy beam,
wherein the phase-change type optical disk includes a dielectric layer in contact with at least one side of the phase-change type recording layer, and the phase-change type recording layer contains, as its main component, at least one selected from the group consisting of Te, Se, Sb, In, and Ge,
said dielectric layer comprises, as main components thereof, at least one selected from the group consisting of Ge and Si, and N, and Cr in an amount of 5 to 40 atom %, and
the phase-change type recording layer has a thickness that is between 5 and 15 nm and the phase-change recording layer comprises Cr in an amount of 0.5 to 10 atom %.

6. An optical information recording medium according to claim 5, wherein the phase-change type recording layer has a composition represented by SbTeCr, GeSbTeCr, GeSbTeSeCr, GeTeCr, TeSnGeCr, GaSbCr, InSeCr, InSbCr, InSbTeCr, InSbSeCr, or InTeSeCr.

7. An optical information recording medium according to claim 6, wherein the phase-change type recording layer further comprises at least one element selected from the group consisting of Ti, Zr, Hf, V, Nb, Ta, Mo, W, Mn, Tc, Re, Cu, Ag, Au, Zn, and Cd.

8. An optical information recording medium according to claim 5, wherein the phase-change type recording layer has a composition represented by GeSbTeCr.

9. An optical information recording medium according to claim 8, wherein the phase-change type recording layer further comprises at least one element selected from the group consisting of Ti, Zr, Hf, V, Nb, Ta, Mo, W, Mn, Tc, Re, Cu, Ag, Au, Zn, and Cd.

* * * * *

UNITED STATES PATENT AND TRADEMARK OFFICE
CERTIFICATE OF CORRECTION

PATENT NO.     : 6,660,451 B1
DATED          : December 9, 2003
INVENTOR(S)    : Sakaue et al.

It is certified that error appears in the above-identified patent and that said Letters Patent is hereby corrected as shown below:

<u>Title page,</u>
Item [57], ABSTRACT,
Line 11, "aid the dielectric" should read -- and the dielectric --

<u>Column 13,</u>
Lines 27-28, "phase-hange" should read -- phase-change --

<u>Column 14,</u>
Line 10, "in which au" should read -- in which an --

Signed and Sealed this

Fifteenth Day of June, 2004

JON W. DUDAS
*Acting Director of the United States Patent and Trademark Office*